Feb. 2, 1965     J. L. FISHER     3,168,284
HOIST MECHANISM
Filed July 18, 1962     3 Sheets-Sheet 2
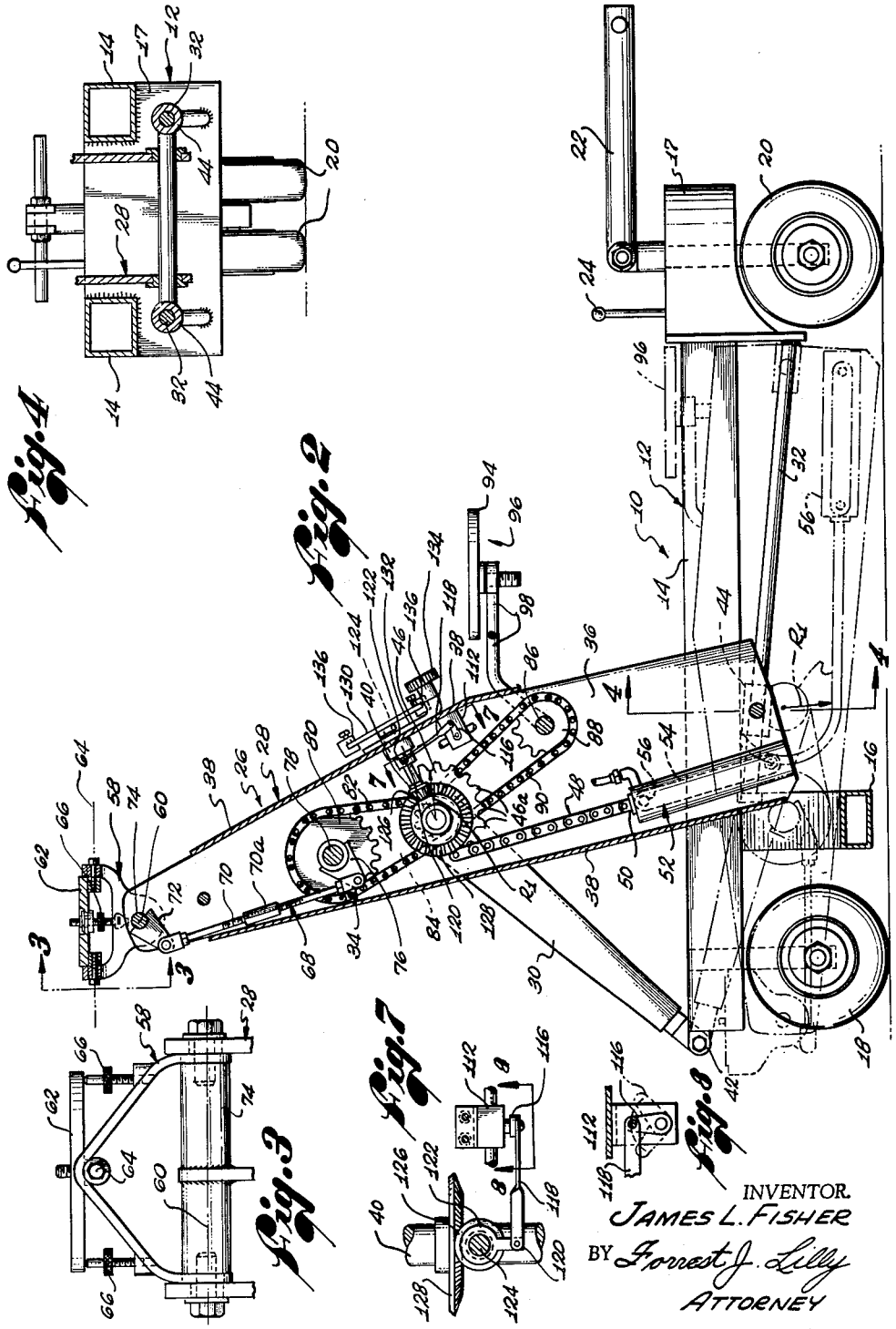
INVENTOR.
JAMES L. FISHER
BY Forrest J. Lilly
ATTORNEY Feb. 2, 1965
J. L. FISHER
3,168,284
HOIST MECHANISM
Filed July 18, 1962
3 Sheets-Sheet 3
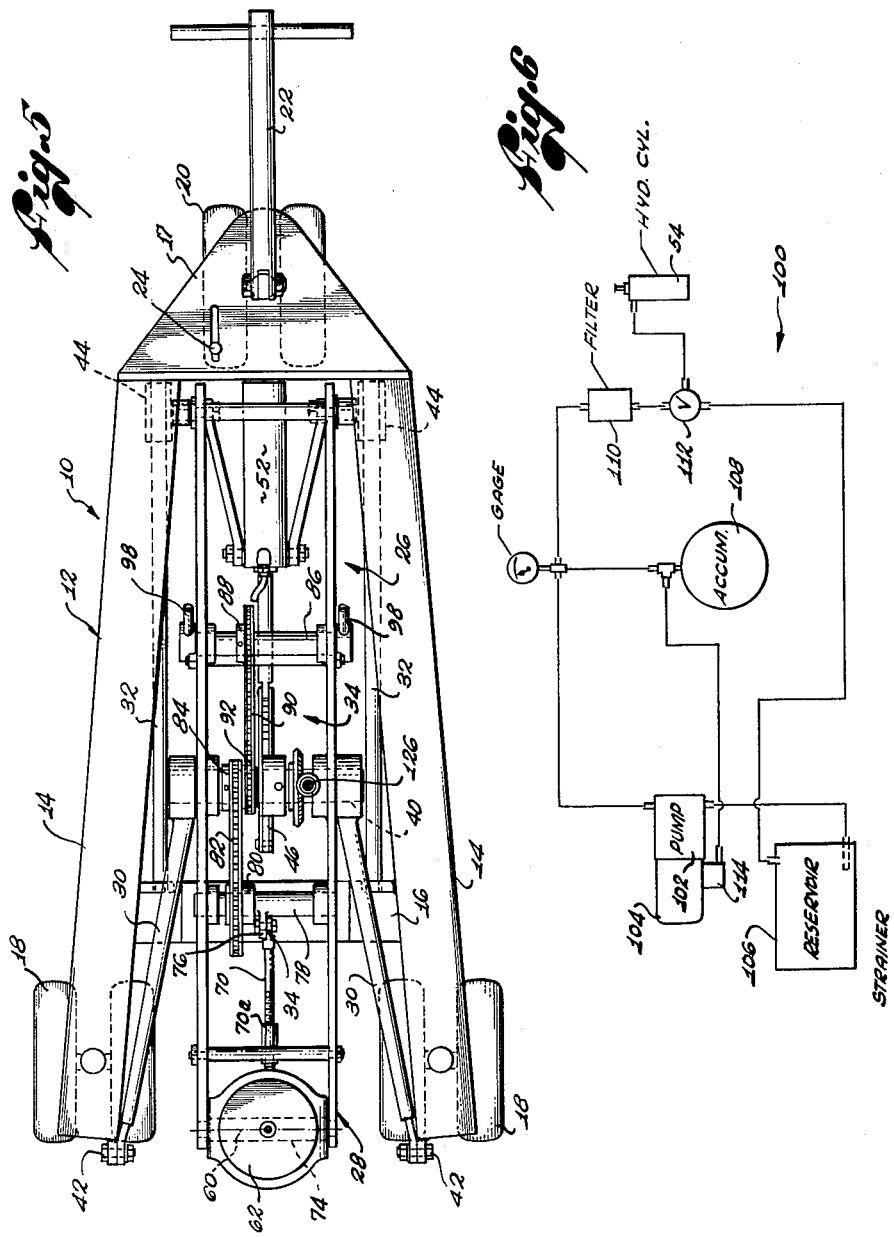
INVENTOR.
JAMES L. FISHER
BY Forrest J. Lilly
ATTORNEY

United States Patent Office 3,168,284
Patented Feb. 2, 1965

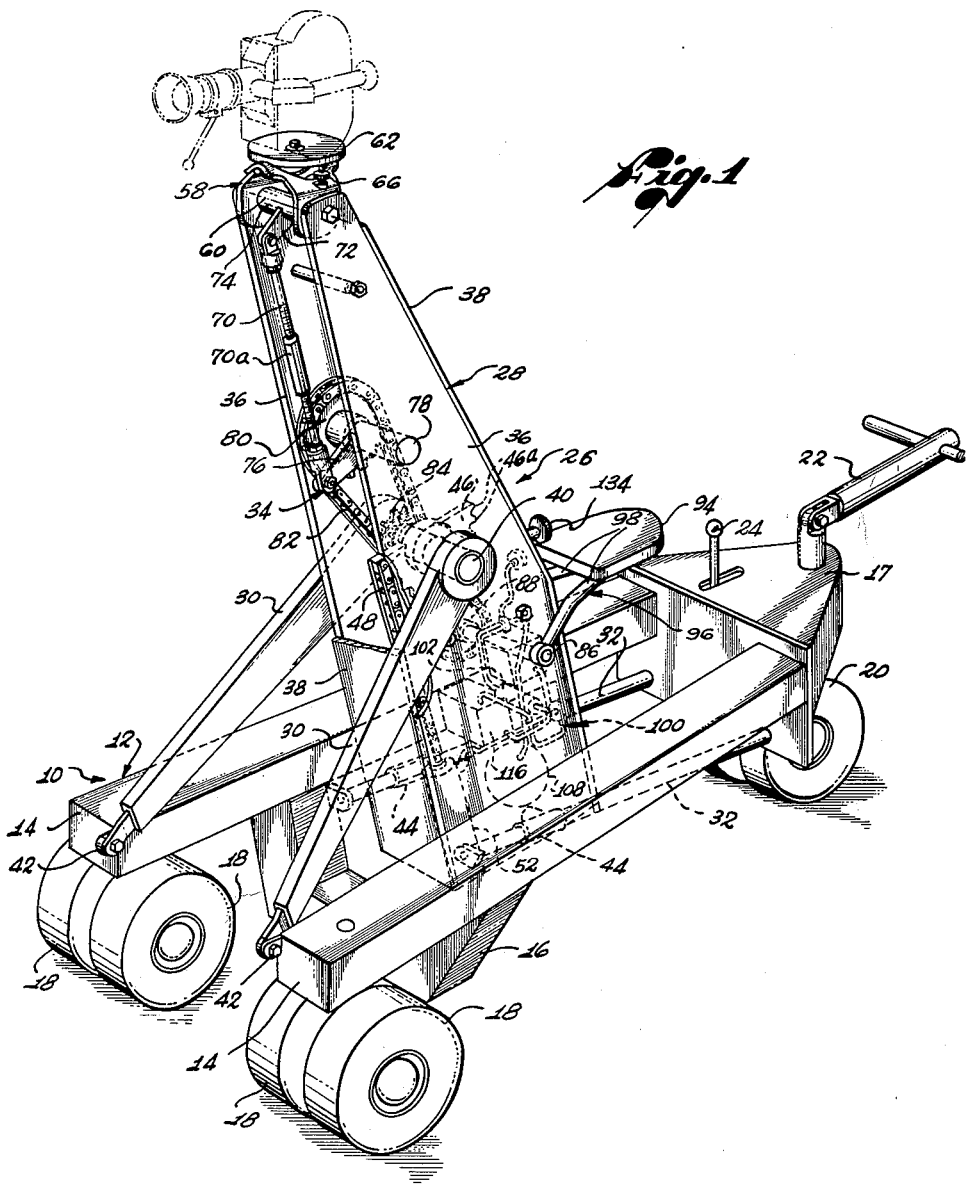

3,168,284
HOIST MECHANISM
James L. Fisher, 3981 Weslin Ave., Sherman Oaks, Calif.
Filed July 18, 1962, Ser. No. 210,783
9 Claims. (Cl. 254—8)

This invention relates generally to hoists and particularly to improvements in camera hoists.

The camera hoist of the present invention is of the kind in which a camera boom and supporting links therefor are mounted on a supporting base, such as a wheeled dolly, for toggle-like motion between a lowered position and an elevated position. In the lowered position of the hoist, the boom is generally horizontally disposed to locate the camera thereon close to the floor. In the elevated position of the hoist, the boom stands generally upright to locate the camera a maximum distance above the floor. The camera itself is mounted on a hinged platform on the end of the boom. This platform is pivoted as the boom raises and lowers in such a way that the platform and, therefore, the camera supported thereon remain horizontal at all times.

One of the major deficiencies of existing camera hoists of this kind is that a force of relatively large magnitude is required to elevate the camera boom from its lowered position, the required elevating force diminishing rapidly as the boom approaches its elevated position. Elevation of the boom through the initial portion of its vertical motion from its lowered position, therefore, requires a relatively massive and powerful elevating mechanism, substantially larger and more powerful than that required to elevate the boom through the final portion of its vertical motion. The existing camera hoists of this kind are, therefore, highly inefficient. More important, however, is the fact that the powerful elevating mechanisms required in these camera hoists are usually quite noisy, a characteristic which obviously is highly objectionable in motion picture and television work.

A principal object of the present invention is to provide an improved camera hoist of the character described having an elevating mechanism which is so uniquely constructed and arranged that the force required to elevate the camera boom remains substantially constant, at a magnitude appreciably less than the maximum elevating force required in existing camera hoists of this character, throughout substantially the entire vertical motion of the boom from its lowered position to its elevated position.

Another object of the invention is to provide an improved camera hoist of the character described in which the camera-supporting platform on the camera boom is maintained horizontal throughout the vertical motion of the boom in a new and unique way.

Yet another object of the invention is to provide a camera hoist of the character described having a camera operator's seat on the camera boom which also remains horizontal as the boom raises and lowers.

A further object of the invention is to provide a camera hoist of the character described in which the vertical motion of the camera boom may be adjustably limited to facilitate accurate adjustment of the camera from one preset height to another preset height during the shooting of a scene.

A still further object of the invention is to provide a camera hoist of the character described in which the camera-to-subject distance remains relatively constant throughout the vertical motion of the boom.

Yet a further object of the invention is to provide a camera hoist of the character described which is relatively simple in construction and economical to manufacture as well as otherwise ideally suited to its intended purposes.

Other objects, advantages, and features of the invention will become evident as the description proceeds.

Briefly, the objects of the invention are attained in the illustrative embodiment thereof by providing a camera hoist in which the force for elevating the camera boom is furnished by a hydraulic piston acting through a flexible force-transmitting member which is trained around a curved segment extending about the axis of the pivotal connection between the boom structure and its supporting link structure. The force-transmitting member is anchored at one end to the segment and the latter is fixed to one of said structures. The hydraulic cylinder is anchored to the other structure.

When the hydraulic cylinder is pressurized, a tension force is created in the flexible force-transmitting member of the elevating mechanism which acts through the segment to produce a torque or force on the boom and its supporting links that draws the lower, pivotally supported ends thereof toward one another, thereby elevating the boom. As the boom elevates, the force-transmitting member unwraps from the segment in such a way that the elevating force remains substantially constant.

The camera supporting platform and the operator's seat are both pivotally supported on the camera boom and are operatively connected to the shaft of the elevating segment in a unique way which maintains the seat and platform horizontal as the boom raises and lowers. The hoist is provided with adjustable limit stops which actuate the control valve for the elevating piston, in response to the boom elevating or lowering to the positions of the stops, to terminate vertical movement of the boom.

The invention will be better understood from the following detailed description of a presently preferred embodiment thereof taken in connection with the attached drawings, wherein:

FIG. 1 is a view in perspective of a camera dolly embodying the present hoist mechanism and showing the latter in an elevated position;

FIG. 2 is a longitudinal section through the camera dolly in FIG. 1 showing, in phantom lines, the hoist mechanism in its lowered position;

FIG. 3 is an enlarged section taken on line 3—3 in FIG. 2;

FIG. 4 is a section taken on line 4—4 in FIG. 2;

FIG. 5 is a top plan view of the camera dolly with the hoist mechanism in its lowered position;

FIG. 6 diagrammatically illustrates the hydraulic system of the camera dolly;

FIG. 7 is an enlarged section taken on line 7—7 in FIG. 2; and

FIG. 8 is a view looking in the direction of the arrows on line 8—8 in FIG. 7.

In FIG. 1 of these drawings, the illustrated camera hoist will be seen to comprise a supporting base 10 comprising a wheeled camera dolly. This dolly has a frame 12 including side members 14 joined by an intermediate connecting strut 16 and a rear hollow frame portion 17. At its forward end, the dolly has two sets of supporting wheels 18 mounted on the side frame members 14. At its rear end, the dolly has a single supporting wheel set 20 mounted on the connecting frame portion 17. The three wheel sets are operatively connected by means (not shown) within the dolly frame for selective simultaneous steering movement of all the wheels, or independent steering movement of the rear wheels 20, by rotation of a steering handle 22. Shifting between the two modes of steering is accomplished by a shift lever 24.

Mounted on this dolly is the present hoist mechanism 26 proper. Briefly, this hoist comprises a camera boom structure 28, a supporting link structure 30 therefor, rails 32 which slidably support the lower end of the camera boom, and elevating mechanism 34 for effecting raising and lowering of the boom 28 in the manner hereinafter more fully described. The improvements of the present invention reside primarily in this latter mechanism.

Referring now in greater detail to the hoist 26, the camera boom 28 will be seen to comprise a hollow frame structure including side walls 36 which are rigidly joined by connecting walls 38. Extending through and journaled in the side walls 36 of the boom is a torque shaft 40. The ends of this shaft extend a short distance beyond the side walls, as shown. One end of the supporting links 30 are apertured to receive and are rigidly fastened to these projecting ends of the shaft. The other ends of the links are pivoted on the forward ends of the dolly frame members 14 at 42.

Pivotally mounted on the side walls 36 of the camera boom 28, adjacent the lower end of the boom, are bearing sleeves 44. These bearing sleeves are rotatable with respect to the boom, on a common axis normal to the boom, and are slidably supported on the rails 32. Rails 32 are attached at their ends to the dolly frame members 14 and extend in the fore and aft direction of the dolly with a slight upward incline in the forward direction of the dolly. The reason for this incline will appear shortly.

From the description thus far of the hoist 26, it is evident the latter is movable between a lowered position shown in phantom lines in FIG. 2 and an elevated position shown in solid lines in that figure. In the lowered position of the hoist, the camera boom 28 is generally horizontally disposed between the side frame members 14 of the dolly 10. In the elevated position of the hoist, the camera boom is disposed in a generally upright position. During movement of the hoist between its lowered and elevated positions, the camera boom 28 and links 30 undergo a toggle-like motion during which the bearing sleeves 44 on the camera boom slide along their supporting rails 32.

The mechanism 34 for effecting movement of the camera hoist 26 between its lowered and elevated positions will now be described. This mechanism comprises a segment or sector plate 46 keyed on the shaft 40. Fixed at one end to the segment is a flexible force-transmitting member 48. The other end of member 48 is attached to the piston 50 of a hydraulic linear actuator 52. The cylinder 54 of this actuator is pivotally mounted at 56 between the side walls 36 of the camera boom adjacent the lower end of the latter.

From this descrption, it is evident that when hydraulic fluid is supplied to the actuator 52 to move the actuator piston 50 toward the lower end of the camera boom, a tension force is transmitted through the force-transmitting member 48 to the segment 46. This force creates a torque on the segment and the torque shaft 40 rigid therewith which moves the lower end of the camera boom forwardly toward the lower ends of the links 30. The camera boom and its supporting links are thereby elevated with a toggle-like motion. Removal of hydraulic pressure from the actuator permits the boom and links to descend toward their lowered position by gravity. Thus, the camera boom can be selectively raised and lowered or retained in any desired position by controlling the flow of hydraulic fluid to or from the hydraulic actuator.

In the hoist mechanism illustrated, segment or sector plate 46 has sprocket teeth 46a and the force-transmitting member 48 comprises a sprocket chain which drivably engages the sprocket teeth. It is evident, however, that a piston, drum and cable or some other suitable mechanism, such as a rotary hydraulic actuator, may be used in place of the illustrated piston sprocket segment and sprocket chain.

As will be seen shortly, the arrangement of the elevating mechanism 34 is such that the hydraulic actuator force required to elevate the camera boom 28 remains substantially constant throughout the vertical movement of the boom. As a result, an actuator of minimum size and power can be used in the present camera hoist. The noise produced by the elevating mechanism is thereby minimized.

Pivotally mounted on the upper end of the camera boom 28 is a camera supporting frame 58. This frame pivots on an axis 60 parallel to the torque shaft 40 and to the pivot axis of the lower camera boom bearings 44. A camera supporting platform 62 is pivotally mounted on the frame 58 on an axis 64 normal to the pivot axis 60 of the frame. Leveling screws 66 are provided for leveling the platform 62 about the axis 64.

Indicated at 68 are means for maintaining the camera platform 62 horizontal as the camera boom raises and lowers. This means comprises a longitudinally adjustable connecting rod 70 pivotally attached at one end to an arm 72 rigid on a shaft 74. This shaft 74 is fixed to the camera supporting frame 58 and is the means which supports the frame on the camera boom for pivoting on the axis 60. The other end of the connecting rod 70 is pivotally attached to an arm 76 rigid on a shaft 78. Shaft 78 parallels shafts 40 and 74 and is rotatably supported in the side plates 36 of the camera boom.

Keyed on shaft 78 is a sprocket 80. A sprocket chain 82 is trained about this sprocket and a smaller sprocket 84 on the torque shaft 40.

From the above description of the camera platform leveling mechanism 68, it is evident that as the camera boom 28 raises and lowers, torque shaft 40 rotates with respect to the boom. This relative rotation of the torque shaft imparts rotation to the sprocket 80 through the sprocket chain 82. Rotation of sprocket 80, in turn, imparts pivotal movement to the camera platform 62, about its pivot axis 60, through the connecting rod 70. The various elements of the leveling mechanism 68 are proportioned so that the camera platform is maintained exactly horizontal throughout the vertical motion of the camera boom. Angular leveling adjustment of the camera platform about its pivot axis 60 is effected by adjusting a coupling 70a in the connecting rod 70 to shorten or lengthen the latter as required to initially level the camera platform about the axis 60.

Extending through and journaled in the side walls 36 of the camera boom below the torque shaft 40 is a shaft 86. Rigid on this shaft is a sprocket 88. A sprocket chain 90 is trained about sprocket 88 and a smaller sprocket 92 on the torque shaft 40. Shaft 86 is thus rotated from the torque shaft 40, as the boom raises and lowers, in the same way as shaft 78 described earlier.

Over the camera boom is positioned a camera operator's seat 94. Seat 94 is rigidly fixed to a yoke frame 96, the yoke arms 98 of which straddle the camera boom and are fixed to the ends of the shaft 86. Thus, seat 94 undergoes angular movement with shaft 86 and with respect to the camera boom as the latter raises and lowers. The direction of this relative angular movement is obviously such that the seat will be maintained horizontal if the sprockets 88 and 92 are properly proportioned.

Camera boom 28 is raised and lowered by a hydraulic system 100 which will now be described by reference to FIG. 6. In this figure, the hydraulic system 100 will be seen to comprise a hydraulic pump 102 which can be operated by hand but is shown as being driven by a motor 104. The intake of pump 102 connects to a hydraulic fluid reservoir 106. The discharge of the pump connects to a hydraulic accumulator 108 and to the hoist elevating cylinder 54 through a filter 110 and a three-position valve 112. One port of the valve 112 connects to the return line leading back to the reservoir 106. In one position, valve 112 connects the cylinder 54 to the pump 102 and the accumulator 108. In the second position, valve 112 connects the cylinder 54 to the reservoir 106 through the return line. The third position of the valve is its closed position.

Pump motor 104 is energized through an automatic control system 114 responsive to the pressure in accumulator 108. This control system operates to turn the pump motor on and off as required to maintain the accumulator pressure above a preset minimum level.

From this description, it is evident that the camera boom elevating cylinder 54 may be selectively pressurized to elevate the camera boom, vented to the reservoir 106 to permit the camera boom to lower under the action of gravity, or hydraulically locked to retain the camera boom in a stationary position by appropriately positioning the control valve 112.

Referring to FIG. 2, the control valve 112 is mounted on the underside of the top wall 38 of the camera boom 28. The valve has a rotary valve operating arm 116 which occupies its full line position in FIG. 8 when the valve is closed. The valve arm is movable to one phantom line position from this closed position to connect the camera boom elevating cylinder 54 to the hydraulic accumulator 108 (FIG. 6) to effect elevating of the boom. The valve arm is movable to its other phantom line position in FIG. 8 to connect the elevating cylinder to the return line and thereby effect lowering of the boom by gravity.

Pivotally connected at one end to the end of the valve arm 116 is a link 118. The other end of link 118 is pivotally attached to a radial projection 120 on a sleeve 122. Sleeve 122 extends through and is rotatably supported in the top wall 38 of the camera boom with the axis of the sleeve intersecting the axis of the shaft. Extending through and supported for rotation and against axial movement in the sleeve 122 is a shaft 124. Rigid on the lower end of this shaft is a bevel gear 126. Gear 126 meshes with a larger bevel gear 128 rigid on the torque shaft 40. Gears 126 and 128 are proportioned so that shaft 124 turns through one revolution or less during movement of the camera boom between its lowered position and its elevated position.

A disc 130 is fixed to the upper end of shaft 124. Extending radially from the upper end of sleeve 122 is an arm 132 terminating in a right angle handle extending upwardly past the edge of the disc 130. Rotation of the handle 134 in one direction acts through sleeve 122 and link 118 to shift the valve arm 116 to its camera boom elevating position. Rotating of the handle 134 in the opposite directions shifts the valve arm to its boom lowering position. Valve arm 116 is located in its closed position by locating the handle 134 in a central or neutral position.

Adjustably and removably fixed to the disc 130 are a pair of limit stops 136. When the control handle 134 is shifted to its boom elevating position to raise the camera boom 28, disc 130 rotates as the boom raises. Eventually, one limit stop 136 will rotate around into engagement with the control handle 134 and return the latter to its neutral position, thereby arresting the vertical movement of the camera boom. If the control handle is moved to its boom lowering position, the other limit stop will eventually rotate into engagement with the control handle 134 and return the latter to its neutral position, thereby again arresting the vertical movement of the camera boom.

From this description, it is evident that the camera boom can be brought to rest in any desired vertical position, both during lowering and elevating of the boom, by apropriate positioning of the limit stops. The disc 130 may bear a suitable scale to facilitate positioning of the limit stops in this way. The advantage of these limit stops is obvious. Thus, during a rehearsal of a scene, the limit stops can be preset in accordance with the desired elevation to which the boom is to be raised or lowered. During actual shooting of the scene, it is only necessary, then, to shift the control handle 134 to initiate vertical movement in the desired vertical direction. The boom will automatically come to rest in the desired position. Moreover, the valve 112 will be relatively gradually closed by the limit stops so that the vertical motion of the boom is gradually rather than abruptly arrested. Sudden jarring of the camera on the boom is thereby eliminated. In some cases, of course, only one of the limit stops may be used. In other cases, both limit stops may be removed to permit unrestricted vertical movement of the camera boom.

Operation of the hoist mechanism 26 is obvious from the preceding description. Thus, the camera boom 28 can be raised, lowered, or stationarily positioned at any selected elevation by appropriate adjustment of the control handle 134. This handle is conveniently located to a camera operator seated on the seat 94. As the camera boom raises and lowers, the camera platform 62 and seat 94 are both rotated in such a way that they remain horizontal throughout the vertical travel of the boom.

The camera platform 62 moves substantially along a vertical line during raising and lowering of the boom. Accordingly, the distance between the camera on the platform and the subject being photographed remains essentially constant during vertical movement of the boom. It is obvious that vertical adjustment of the forward ends of the camera boom supporting rails 32, when the camera boom occupies its elevated position, would have the effect of changing the height of the camera platform 62. Thus, by inclining the rails upwardly toward their forward ends, as shown in FIG. 2, the cemera height in the elevated position of the camera boom and the total vertical travel of the camera are increased. The camera can, of course, be lowered to substantially the same position as though the rails were horizontal.

A principal advantage of the present hoist mechanism is that the hydraulic actuator force required to raise the camera boom remains substantially constant, at a value appreciably less than that required in a conventional hoist, throughout a major portion of the entire vertical motion of the boom. This has been proved by actual operation of the hoist and is due primarily to the fact that the sprocket segment 46 is eccentric, as shown best in FIG. 2, so that the radius of the segment varies progressively around the latter. Thus, the effective segment radius or torque arm on which the hydraulic actuator force acts, through the force-transmitting element or sprocket chain 48, progressively changes as the camera boom elevates. An inspection of FIG. 2 will show that the eccentricity of the segment 46 is such that the force of the hydraulic actuator 52 acts on the maximum radius or torque arm $R_1$ of the segment when the camera boom is in its lowered position. The effective torque arm on which the hydraulic actuator force acts decreases as the camera boom raises.

Thus, a maximum torque for elevating the camera boom is created by a given hydraulic actuator force when the camera boom is in its lowered position wherein the force required to elevate the boom is the greatest. The torque exerted on the boom by said given actuator force decreases progressively as the boom elevates as does the force required to elevate the boom. Obviously, therefore, the force of the hydraulic actuator 52 required to elevate the camera boom may be made to remain substantially constant by appropriately shaping and proportioning the segment 46.

I have found, however, that even when using a concentric segment, i.e., a segment whose radius is constant about the segment, the hydraulic actuator force required to elevate the camera boom remains reasonably constant. Accordingly, I do not wish to limit my invention to the use of an eccentric segment, as illustrated, although the latter segment is preferred.

Clearly, therefore, the invention herein described and illustrated is fully capable of attaining the objects and advantages preliminarily set forth. While a presently preferred embodiment of the invention has been disclosed, numerous modifications in the design, arrangement of parts, and instrumentalities of the invention are obviously possible within the scope of the following claims.

What is claimed is:

1. A hoist mechanism comprising:
   a supporting base;
   a boom pivotally supported for vertical swinging movement on said base;
   hydraulic elevating means including a valve for effecting raising, lowering and stationary positioning of said boom;
   a member operatively connected to said elevating means for movement proportional to vertical movement of said boom; and
   means including adjustable limit stop means on said member for operating said valve to terminate movement of said boom in response to predetermined vertical movement of the boom.

2. A hoist mechanism comprising:
   a supporting base;
   a boom pivotally supported for vertical swinging movement on said base;
   hydraulic elevating means including a valve for effecting raising, lowering and stationary positioning of said boom;
   a member carried by said boom and operatively connected with said elevating means for movement with respect to the latter in proportion to vertical movement of the boom;
   a handle for operating said valve located proximate to said member; and
   limit stop means adjustably fixed to said member for engagement with said handle to terminate vertical movement of the boom in response to predetermined vertical movement of the boom.

3. A hoist mechanism comprising:
   a supporting base;
   a boom having upper and lower ends;
   means supporting the lower end of said boom on said base for generally horizontal sliding movement and pivoting of the boom on a generally horizontal axis;
   a transverse shaft rotatably supported on said boom intermediate its ends;
   links pivoted at one end on said base an rigidly fixed at their other ends to said shaft;
   said links and boom being movable between a lowered position wherein and boom is generally horizontal and an elevated position wherein said boom is generally upright;
   a segment fixed on said shaft;
   a hydraulic linear actuator on said boom including a piston and a flexible force transmitting element anchored at one end to said piston and at the other end to said segment and wrapped around said segment when said boom and links are in said lowered position, whereby hydraulic pressure in said actuator creates a torque on said segment for raising said boom;
   means including a valve for selectively supplying hydraulic fluid to, venting, and hydraulically locking said actuator;
   a rotatable disc on said boom operatively connected to said shaft for rotation in proportion to vertical movement of the boom;
   a movable handle on said boom operatively connected to said valve for operating the latter; and
   adjustable limit stop means on said disc engageable with said handle to terminate vertical movement of said boom in response to predetermined vertical movement of the boom.

4. A hoist mechanism comprising:
   a supporting base;
   a boom having upper and lower ends;
   longitudinally extending track means on said base;
   slide means movable along said track means;
   means pivotally connecting the lower end of said boom to said slide means for swinging of said boom in a normally vertical plane parallel to said track means;
   link means pivotally connected at one end to said base adjacent one end of said track means and at the other end to said boom on pivot axes parallel to the pivot axis of the pivotal connection between said boom and slide means, whereby said boom and link means are vertically movable between a lowered position in which said boom is generally horizontal and an elevated position in which said boom is generally upright;
   a shaft rotatably supported on said boom on the axis of the pivotal connection between said boom and link means and rigid with the latter means; and
   torque-producing means coacting between said shaft and boom for creating a torque between said boom and link means to effect selective movement of said boom and link means between said positions, said torque-producing means including a member fixed directly to said shaft, a member fixed to said boom, and power means operable between said members to create said torque.

5. A hoist mechanism comprising:
   a supporting base;
   a boom having upper and lower ends;
   longitudinally extending track means on said base;
   slide means movable along said track means;
   means pivotally connecting the lower end of said boom to said slide means for swinging of said boom in a normally vertical plane parallel to said track means;
   link means pivotally connected at one end to said base adjacent one end of said track means and at the other end to said boom on pivot axes parallel to the pivot axis of the pivotal connection between said boom and slide means, whereby said boom and link means are vertically movable between a lowered position in which said boom is generally horizontal and an elevated position in which said boom is generally upright;
   a sector plate rigid on said link means on the axis of the pivotal connection between the latter means and boom;
   a hydraulic linear actuator on said boom including a flexible force-transmitting element anchored at one end to said sector plate so as to wind around the curved edge of the plate when said link means and boom descend toward said lowered position, whereby hydraulic pressure in said actuator creates a tension force in said element which acts on the radius of said sector plate to produce a torque between said link means and boom for elevating the link means and boom and said link means and boom descend under the action of gravity upon venting of said actuator; and
   means for selectively supplying hydraulic fluid to, venting, and hydraulically locking said actuator.

6. The subject matter of claim 5, wherein said sector plate is eccentric so that the effective radius of said plate on which said tension force acts increases as said link means and boom descend toward said lowered position, whereby a given hydraulic pressure in said actuator produces a maximum elevating torque between said link means and boom when the link means and boom occupy said lowered position.

7. A hoist mechanism comprising:
   a supporting base;
   a boom having upper and lower ends;
   longitudinally extending track means on said base;
   slide means movable along said track means;
   means pivotally connecting the lower end of said boom to said slide means for swinging of said boom in a normally vertical plane parallel to said track means;
   a transverse shaft rotatably supported on said boom intermediate the ends of the boom for turning on an axis parallel to the axis of the pivotal connection between said boom and slide means;
   links pivoted at one end on said base adjacent one end of said track means on an axis parallel to said first mentioned pivot axes and rigidly fixed at their other ends to said shaft in straddling relation to said boom; said links and boom being movable between a lowered position wherein said boom is generally horizontal and an elevated position wherein said boom is generally upright;

a sector plate fixed on said shaft;

a hydraulic linear actuator on said boom including a piston and a flexible force-transmitting element anchored at one end to said piston and at the other end to said sector plate so as to wind around the curved edge of the plate when said boom and links descend toward said lowered position, whereby hydraulic pressure in said actuator creates a torque between said links and boom for elevating the links and boom and said links and boom descend when said actuator is vented; and means for selectively supplying hydraulic fluid to, venting, and hydraulically locking said actuator.

8. The subject matter of claim 4 including:

a camera platform pivotally supported on the upper end of said boom;

a second shaft rotatable on said boom parallel to said first-mentioned shaft;

means drivably connecting said shafts, whereby said second shaft is rotated during vertical movement of the boom;

means connecting said platform and said second shaft, whereby said platform is pivoted on said boom as the latter raises and lowers, said last-mentioned means including a connecting rod pivotally connected at one end to said second shaft on a pivot axis parallel to and offset from the axis of the second shaft and pivotally connected at its other end to said platform on a pivot axis parallel to and offset from the pivot axis of the platform, and means for adjusting the length of said rod thereby to adjust the platform about its pivot axis on the boom; and said connecting means including means for maintaining the angle of said platform with respect to the horizontal substantially constant through the vertical movement of said boom.

9. A hoist mechanism comprising:

a supporting base;

a boom having upper and lower ends;

longitudinally extending track means on said base;

slide means movable along said track means;

means pivotally connecting the lower end of said boom to said slide means for swinging of said boom in a normally vertical plane parallel to said track means;

link means pivotally connected at one end on said base adjacent one end of said track means and at the other end to said boom on pivot axes parallel to the pivot axis of the pivotal connection between said boom and slide means, whereby said boom and link means are vertically movable between a lowered position in which said boom is generally horizontal and an elevated position in which said boom is generally upright;

a first shaft rotatably supported on said boom on the axis of the pivotal connection between said boom and link means and rigid with the latter means;

torque-producing means coacting between said shaft and boom for creating a torque between said boom and link means to effect selective movement of said boom and link means between said positions, said torque-producing means including a member fixed directly to said shaft, a member fixed to said boom, and power means operable between said members to create said torque;

second and third shafts rotatably supported on said boom parallel to said first shaft;

means drivably coupling said first and second shafts, whereby said second shaft is rotated during vertical movement of said boom;

means drivably coupling said first and third shafts, whereby said third shaft is rotated during vertical movement of said boom;

a camera platform pivotally mounted on the upper end of said boom on a pivot axis parallel to said first-mentioned axes;

means connecting said platform and second shaft, whereby said platform pivots on the boom as the latter moves vertically;

an operator's seat pivotally mounted adjacent the lower end of said boom on a pivot axis parallel to said first-mentioned pivot axes;

means connecting said seat and third shaft, whereby said seat pivots on said boom as the latter moves vertically;

the connections between said first and second shafts and between asid second shaft and platform including means for maintaining said platform at a substantially constant angle to the horizontal during vertical movement of the boom between said lowered and elevated positions; and the connections between said first and third shafts and between said third shaft and seat including means for maintaining said seat at a substantially constant angle to the horizontal during vertical movement of the boom between said lowered and elevated positions.

References Cited in the file of this patent

UNITED STATES PATENTS

| | | |
|---|---|---|
| 2,073,998 | Raby | Mar. 16, 1937 |
| 2,719,471 | Aspden et al. | Oct. 4, 1955 |
| 2,785,807 | Prowinsky | Mar. 19, 1957 |
| 2,995,380 | King | Aug. 8, 1961 |

FOREIGN PATENTS

| | | |
|---|---|---|
| 782,530 | Great Britain | Sept. 11, 1957 |